(12) United States Patent
Silieti et al.

(10) Patent No.: US 9,068,906 B2
(45) Date of Patent: Jun. 30, 2015

(54) TURBINE BLADE-MOUNTED SENSOR FIXTURE FOR TIP GAP MEASUREMENT

(71) Applicants: Mahmood K. Silieti, Orlando, FL (US); Kevin L. Hines, Sorrento, FL (US); Abdullatif M. Chehab, Chuluota, FL (US)

(72) Inventors: Mahmood K. Silieti, Orlando, FL (US); Kevin L. Hines, Sorrento, FL (US); Abdullatif M. Chehab, Chuluota, FL (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 14/043,878

(22) Filed: Oct. 2, 2013

(65) Prior Publication Data

US 2015/0090017 A1    Apr. 2, 2015

(51) Int. Cl.
| | |
|---|---|
| *G01M 15/14* | (2006.01) |
| *G01M 15/02* | (2006.01) |
| *G01B 21/16* | (2006.01) |
| *F16M 13/02* | (2006.01) |

(52) U.S. Cl.
CPC ............. *G01M 15/02* (2013.01); *G01B 21/16* (2013.01); *F16M 13/02* (2013.01)

(58) Field of Classification Search
CPC ........ G01B 5/14; G01B 11/026; G01B 11/14; G01B 21/16; G01B 5/205; G01B 7/14; G01M 15/02; F16M 13/02
USPC ....................................................... 73/112.01
See application file for complete search history.

(56) References Cited

U.S. PATENT DOCUMENTS

| | | | |
|---|---|---|---|
| 4,322,887 A | | 4/1982 | Burton |
| 4,395,827 A | * | 8/1983 | Stowe et al. .................... 33/655 |
| 4,518,917 A | * | 5/1985 | Oates et al. .............. 324/207.25 |
| 4,632,352 A | | 12/1986 | Stoll |
| 4,704,906 A | | 11/1987 | Churchill et al. |
| 4,911,004 A | | 3/1990 | Leon |
| 4,987,555 A | * | 1/1991 | Twerdochlib ................. 702/158 |
| 5,670,879 A | | 9/1997 | Zombo et al. |
| 6,575,011 B1 | * | 6/2003 | Busby et al. ........................ 73/7 |
| 6,848,193 B1 | * | 2/2005 | Kirzhner .......................... 33/833 |

(Continued)

FOREIGN PATENT DOCUMENTS

| | | |
|---|---|---|
| DE | 1919945 | 4/1971 |
| DE | 2730508 | 1/1979 |

(Continued)

OTHER PUBLICATIONS

Bluetooth Accessory Pack BAP1.0, Philtec E-Newsletter, Dec. 9, 2012, www.philtec.com.

*Primary Examiner* — Freddie Kirkland, III (57) ABSTRACT

Turbine blade tip clearance is measured in a fully assembled turbine casing by mounting a non-contact displacement probe or sensor on a turbine blade that generates data indicative of sensor distance from the turbine casing that circumferentially surrounds the blade. The sensor is mounted on the blade with a sensor fixture, which includes a clamping mechanism and a sensor retention mechanism that retains and calibrates the sensor by selective movement of the sensor relative to the retention mechanism. Variations in sensor distance data are recorded when the turbine is operated in turning gear mode. Blade rotational position data are collected by a rotational position sensor. A data processing system correlates the distance and rotational position data with localized blade tip gap at angular positions about the turbine casing circumference. This method and apparatus facilitate assessment of turbine casing deformation impact on blade tip clearance and rotor/casing alignment.

20 Claims, 9 Drawing Sheets

(56) References Cited

U.S. PATENT DOCUMENTS

| | | | |
|---|---|---|---|
| 7,579,844 B2* | 8/2009 | Ducheminsky et al. | 324/622 |
| 8,102,539 B2* | 1/2012 | Ghulam | 356/614 |
| 8,138,753 B2* | 3/2012 | Eberl et al. | 324/207.25 |
| 8,482,302 B2* | 7/2013 | Suckling et al. | 324/662 |
| 8,485,038 B2 | 7/2013 | Sengupta et al. | |
| 8,684,669 B2* | 4/2014 | Chehab et al. | 415/118 |
| 2003/0020496 A1* | 1/2003 | Eyraud et al. | 324/699 |
| 2003/0222640 A1 | 12/2003 | Twerdochlib et al. | |
| 2005/0088271 A1 | 4/2005 | Lau et al. | |
| 2008/0190211 A1 | 8/2008 | Secq | |
| 2008/0218181 A1* | 9/2008 | Ducheminsky et al. | 324/662 |
| 2009/0000101 A1 | 1/2009 | Reynolds et al. | |
| 2009/0165540 A1* | 7/2009 | Craig | 73/112.01 |
| 2009/0289620 A1* | 11/2009 | Suckling et al. | 324/207.16 |
| 2010/0046008 A1 | 2/2010 | Ghulam | |
| 2010/0117859 A1 | 5/2010 | Mitchell et al. | |
| 2013/0167392 A1 | 7/2013 | Boyer et al. | |
| 2013/0312249 A1 | 11/2013 | Buchal et al. | |

FOREIGN PATENT DOCUMENTS

| | | |
|---|---|---|
| EP | 0242107 | 10/1987 |
| EP | 2397656 | 12/2011 |
| GB | 2112080 | 7/1983 |
| GB | 2460248 | 11/2009 |
| GB | 2462829 | 2/2010 |
| JP | S61161407 | 7/1986 |

* cited by examiner

TURBINE BLADE-MOUNTED SENSOR FIXTURE FOR TIP GAP MEASUREMENT

CROSS-REFERENCE TO RELATED APPLICATIONS

This application claims the benefit of co-pending, commonly owned at time of filing, United States utility patent application entitled "IN-SITU BLADE-MOUNTED TIP GAP MEASUREMENT FOR TURBINES", filed herewith, on Oct. 2, 2013 and assigned Ser. No. 14/043,913, which is incorporated by reference herein.

BACKGROUND OF THE INVENTION

1. Field of the Invention

The invention relates to in-situ measurement of steam or gas turbine blade tip gap between rotating blades and the circumscribing turbine casing ring segment. More particularly, embodiments of the invention relate to in-situ blade tip gap measurement by mounting a radially oriented displacement sensor directly on a turbine blade while in-situ within an industrial gas turbine and rotating the rotor so that the blade sweeps at least a portion of the circumscribing turbine casing ring segment in either the compressor or hot gas turbine sections. In other embodiments of the invention the entire circumference of the circumscribing casing ring segment is swept by rotating the rotor while the industrial gas turbine is operated in turning gear mode.

2. Description of the Prior Art

During assembly and at periodic times throughout the life of a gas turbine blade tip clearances must be measured. Proper tip clearance enables better efficacy of gas turbines and lowers harmful emissions. To date there are ways of measuring tip clearances, but the methods requiring the removal of the upper casing that circumscribes the turbine blade tips during measurement, limited number of inspection points, or take a relatively long time to complete.

There are typically two known common methods for measuring blade tip clearances. In the first method the measurement of tip clearance is typically accomplished by removing the turbine or compressor case upper half to provide access to the blades. Shims are then inserted between the blades tips and the flow path side or ring segments of the lower case at the horizontal joint. Measurements are typically taken at the leading and trailing edge sides of the blade tips for every blade. These measurements are referred to as half shell measurements. This method provides very little accuracy or reproducibility because the lower case tends to change shape without the upper case in place. Also, the half shell measurement locations are not necessarily representative of the local case shape at all angular rotational positions about the entire rotational surface swept by the turbine blade.

The second known common method for measuring blade tip clearances is by opening an inspection port in the side of the engine that is aligned with the blade path. A contact or non-contact probe is inserted into the port to measure the distance of the blade tip from the gas path side of the case or ring segments. There are a limited number of these inspection ports oriented about the turbine casing. Therefore only data from select rows and cord positions can be obtained. Furthermore, as noted above in the description of the first known inspection method the inspection locations may not be representative of the casing shape about the entire rotational circumference of the turbine. In some spots, due to casing shape disparities, there may be varying tip gap.

Thus, a need exists for a method to measure turbine blade tip clearances in-situ within an assembled turbine without removing part of the turbine casing that circumscribes the blade tips.

A need also exists for a method to measure turbine blade tip clearances in-situ within an assembled turbine casing, so that localized blade tip gap differences can be identified and measured.

An additional need exists for a method to determine whether the turbine rotor assembly is aligned within its circumscribing turbine casing, so that alignment can be adjusted to assure rotor rotational axis concentricity within the casing. For example, so that turbine vane carriers are centered to the rotor during alignment verification.

SUMMARY OF THE INVENTION

Accordingly, an object of the invention is to measure turbine blade tip clearances in-situ within an assembled turbine without removing part of the turbine casing that circumscribes the blade tips.

It is also an object of the invention to measure turbine blade tip clearances in-situ within an assembled turbine casing, so that localized blade tip gap differences can be identified and measured.

An additional object of the invention is to determine whether the turbine rotor assembly is aligned within its circumscribing turbine casing, so that alignment can be adjusted to assure rotor rotational axis concentricity within the casing, including but not limited to turbine vane carriers/rotor centering during alignment verification.

These and other objects are achieved in accordance with embodiments of the present invention by using the blade (not the case) as the reference measurement location without removing the cover as is traditionally done. This enables the measurement of the tip clearance of a particular blade along the entire path it makes during one or more revolutions in the engine on turning gear. Embodiments of this method of tip clearance measurement include a non-contact displacement sensor coupled with a data acquisition system to record the measured displacement between the blade and the corresponding circumscribing turbine casing (e.g., the gas path side of the case or the ring segments). In addition, each displacement measurement is related to a an angular rotational clock position around the rotor by a sensor that monitors the rotor rotational position or any other sensor location that is coupled to the turbine. The gap measurement displacement and data acquisition system are coupled to the specified blade using a sensor fixture that is clamped to the blade. Displacement and rotational position data collected are streamed wirelessly in real time during measurement. This method and apparatus provide an accurate and cost effective solution for accessing turbine casing deformation impact on blade tip clearance and rotor/casing alignment.

More particularly, embodiments of the invention feature a method for measuring gas turbine blade tip and turbine casing radial clearance gap in a gas turbine with a rotatable rotor having a turbine blade with a radially outwardly projecting tip in opposed spaced relationship with a circumscribing turbine casing, defining a gap there between. A non-contact displacement sensor that is capable of generating a displacement data set and a sensor fixture including a sensor retention mechanism for calibrating the displacement sensor position and a clamp mechanism for clamping the fixture to the turbine blade are provided to practice the method. The displacement sensor is coupled to the sensor fixture. The sensor fixture is coupled to the turbine blade with the clamp mechanism, so that the non-contact displacement sensor is capable of generating a data set of displacement relative to the circumscribing turbine casing. The displacement sensor position relative to the blade tip is calibrated by moving the displacement sensor within the sensor retention mechanism. A rotor rotational position sensor is coupled to the turbine. The rotor is rotated so that the turbine blade tip sweeps at least a portion of the circumscribing turbine casing while generating the displacement data set with the non-contact displacement sensor and a rotational position data set with the rotational position sensor. The displacement and rotational position data sets are acquired with a data acquisition system that is coupled to the displacement and rotational position sensors. Blade tip and circumscribing turbine casing radial clearance gap relative to rotational position is correlated with the displacement and rotational data sets in a data analyzer system that is coupled to the data acquisition system.

Other embodiments of the invention feature a system for measuring gas turbine blade tip and turbine casing radial clearance gap in a gas turbine having a rotatable rotor, a turbine blade coupled to the rotor with a radially outwardly projecting tip in opposed spaced relationship with a circumscribing turbine casing, defining a gap there between. The system comprises a non-contact displacement sensor that is capable of generating a data set of displacement relative to a circumscribing turbine casing when the sensor is coupled to a turbine blade. The non-contact displacement sensor is coupled to a sensor fixture having a sensor retention mechanism for retaining and calibrating the displacement sensor by selected movement therein relative to a blade tip, and a clamp mechanism for clamping the fixture to a turbine blade. A rotor rotational position sensor is coupled to the turbine that is capable of generating data set of blade rotational position. The system has a data acquisition system that is coupled to the displacement and rotational position sensors, for acquiring the displacement and rotational position data sets during rotor rotation as the turbine blade tip sweeps at least a portion of the circumscribing turbine casing when the sensor fixture is clamped to the turbine blade. A data analyzer system, coupled to the data acquisition system, correlates, with the displacement and rotational data sets, the blade tip and circumscribing turbine casing radial clearance gap relative to rotational position.

Additional embodiments of the invention feature a sensor fixture for coupling a sensor to a turbine blade, comprising a clamp base; a clamp screw coupled to the clamp base, for coupling a turbine blade to the clamp base; and a sensor retention mechanism coupled to the clamp base, for retaining and calibrating a sensor by selective movement of the sensor relative to the retention mechanism.

The objects and features of the present invention may be applied jointly or severally in any combination or sub-combination by those skilled in the art.

BRIEF DESCRIPTION OF THE DRAWINGS

The teachings of the invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the invention can be readily utilized in methods and apparatus for in-situ measurement of steam or gas turbine blade tip gap between rotating blades and the circumscribing turbine casing (e.g., the ring segments or gas paths defined within the casing). using the blade (not the case) as the reference measurement location without removing the cover as is traditionally done. This enables the measurement of the tip clearance of a particular blade along the entire path it makes during one or more revolutions in the engine on turning gear. The measurement system can be moved from blade to blade so that tip gap information can be obtained for a plurality of or all of the blades about their full 360 degree rotational sweep, including critical measurements at the six o-clock or bottom casing location that is susceptible to transient and permanent thermal distortion during engine operation. By performing the tip gap measurements on a fully assembled turbine casing the gathered information is indicative of the actual clearances experienced by an operational turbine, including any potential mechanical or thermal distortions imparted on the casing structure after its assembly. Also, after sufficient cool down of an in-service engine, pre-rebuild tip gap measurements can be obtained for service diagnostic evaluation and to obtain pre-rebuild baseline clearance information suitable for "before" and "after" rebuild evaluation and documentation.

Embodiments of this method of tip clearance measurement and the measurement system include a non-contact displacement sensor within a probe that is coupled with a data acquisition system to record the measured displacement between the blade and the corresponding circumscribing turbine casing (e.g., the gas path side of the case or the ring segments). In addition, an angular position sensor, coupled to the turbine or a blade is used to relate each measurement to an angular rotational clock position around the rotor by measuring the blade orientation with respect to a reference position. The gap measurement displacement and data acquisition system are coupled to one or more of the blades using a mechanical, magnetic, or adhesive gripping mechanism. Embodiments of the invention include sensor fixtures that clamp a non-contact displacement sensor or any other type of sensor or other object to a turbine blade. The sensor fixture also includes a sensor retention mechanism for retaining and calibrating a sensor by selective movement of the sensor relative to the retention mechanism. Data collected can be either stored the data acquisition system internal storage, removable media, or can be streamed wirelessly in real time during measurement. Data collected can also be communicated via a direct cable connection. A data analyzer coupled to the data acquisition system correlates blade tip and circumscribing turbine casing radial clearance gap relative to rotational position with the displacement and rotational data sets. This method and apparatus provide an accurate and cost effective solution for accessing turbine casing deformation impact on blade tip clearance and rotor/casing alignment.

Figure 1:
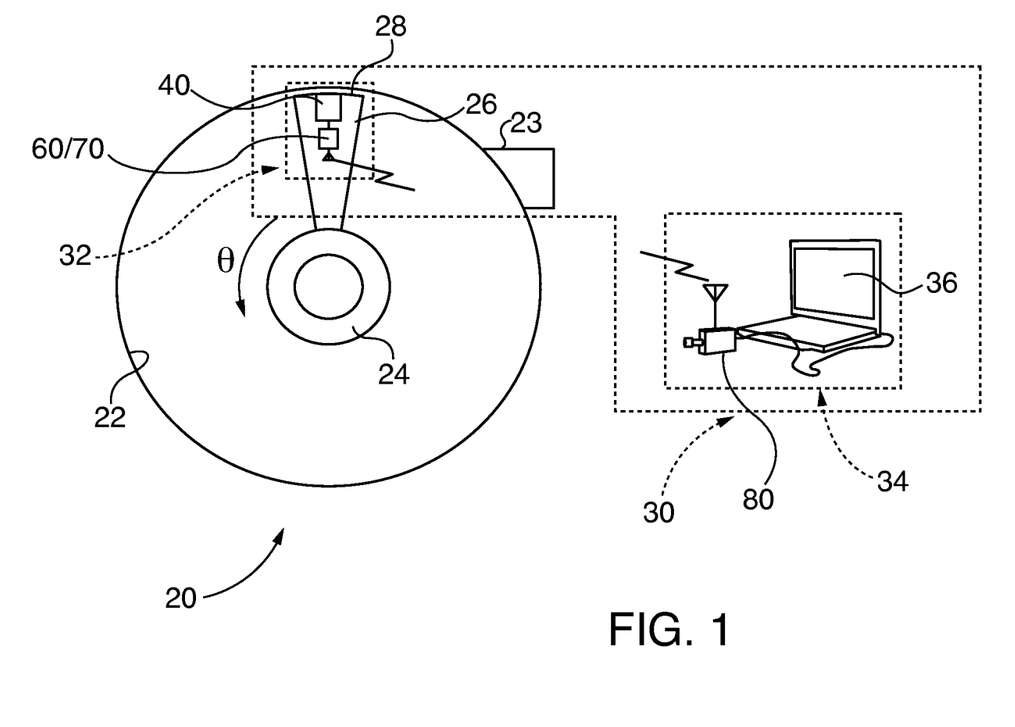
FIG. 1 is an elevational schematic view of an embodiment of a turbine tip gap clearance measurement system of the invention coupled to a turbine, including a blade mounted instrument system with a probe system and a data acquisition system that are communicatively coupled to a data processing system outside the turbine via a wireless communication system.
Figure 2:
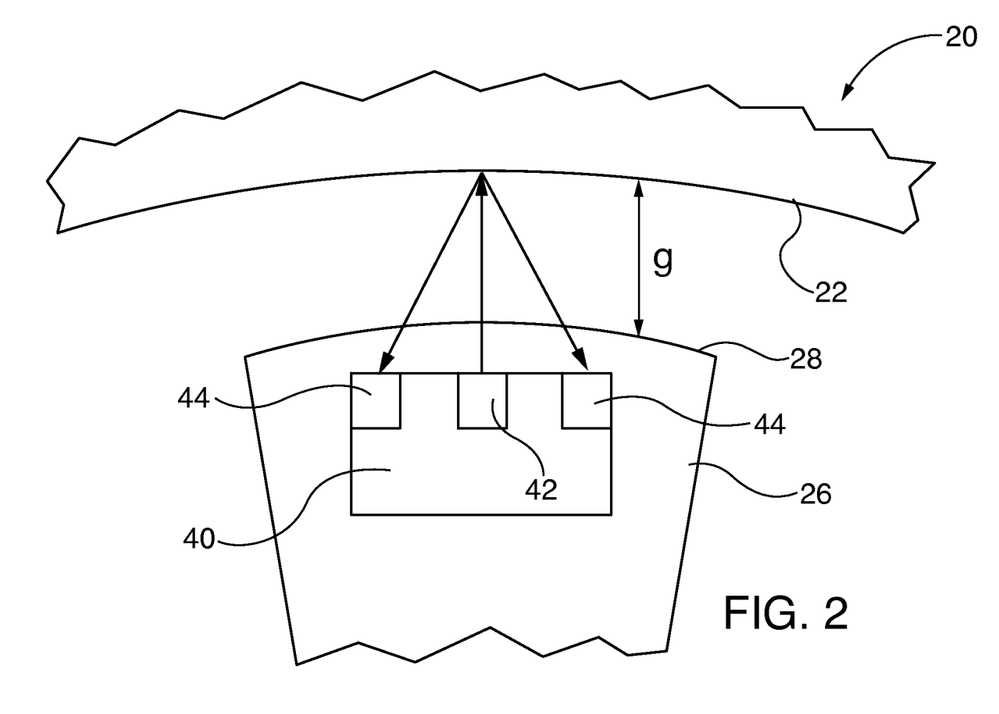
FIG. 2 is a detailed schematic view of an embodiment of a probe system, including a non-contact displacement sensor, coupled to a turbine blade.

FIGS. 1 and 2 show schematically a gas turbine 20, with a turbine casing having an inner circumferential ring segment 22 that defines an inner diameter and an access port 23. Rotor 24 rotates within the turbine 20. Affixed to the rotor 24 are a plurality of rows of turbine blades 26 that are designated $B_1$-$B_N$. Only a single blade row is schematically shown in FIG. 1. As a blade 26 rotates with the rotor 24, it defines a rotational displacement θ; its blade tip 28 sweeps the circumscribing inner circumferential ring segment 22. Radial separation between the mutually opposed and spaced blade tip 28 and the ring segment 22 inner diameter is designated by the gap that is labeled "g" in the figures herein.

The blade tip clearance system 30 embodiment shown in FIGS. 1 and 2 comprises a blade mounted instrument 32 that is communicatively coupled to a blade tip clearance data analyzer system 34. In this embodiment communication is established via wireless communication system, for example one utilizing Bluetooth communications protocol. The data analyzer system 34 may be incorporated into a personal computer 36. Details of the blade clearance system 30 architecture and function are further described.

The blade mounted instrument 32 includes a displacement probe system 40, which as shown in FIGS. 1 and 2 is a non-contact type displacement probe having at least one photonic energy transmitter 42 and a corresponding receiver 44 of known construction. FIG. 2 shows a probe 40 having an arrayed pair of transmitters and receivers. In this embodiment the transmitted and received photonic energy is in the visible spectrum. The displacement probe 40 generates a displacement data set of relative distance between the probe and the circumscribing turbine casing circumferential ring 22. A rotor rotational position acquisition system sensor 60 is also coupled to the blade 26 in order to sense the rotor/corresponding blade's rotational position θ and generate a rotational position data set. The rotational position sensor 60 is of known construction, exemplary embodiments of which may include known tilt, gyroscopic or localized triangulated GPS-type sensors. Alternatively the rotational position sensor function may be performed by an existing turbine rotor rotational position sensor.

The blade mounted displacement probe system 40 and the rotor/blade rotational system sensor 60 are coupled to data acquisition module 70 that acquires the displacement and rotational position data sets. While the data acquisition module 70 is shown coupled to the turbine blade 26 and receives both the displacement and rotational position data sets, alternative locations and data feed configurations are possible in other embodiments. For example, the sensors 40 and 60 may be coupled jointly or severally to a wireless communication module that in turn communicates with a non-blade mounted data acquisition module. Similarly the data acquisition module function may be divided into separate components that receive separate positional or displacement data sets from the respective sensors 40 and 60.

The data acquisition module 70 sends the displacement and rotational position data sets to the data analyzer system 34 via wireless Bluetooth communication with the data analyzer system interface 80. The data analyzer system 34 includes the data analyzer interface 80 and the personal computer 36; the latter correlates blade tip and circumscribing turbine casing radial clearance gap relative to rotational position with the displacement and rotational data sets received from the data acquisition module 70. Blade tip gap g information and relative rotational position in the data analyzer system 34 is available for further analysis, including by way of example relative concentric alignment of the rotor, rotor blades, turbine vanes and the turbine casing inner diameter, concentricity of the turbine casing itself and identification of potential localized wear patterns within the turbine casing lining. If multiple displacement probes 40 are utilized across the axial length of the blade tip 28 annular patterns, rather than just circular patterns of blade tip gap g about the turbine casing circumference can be acquired and analyzed.

Figure 3:
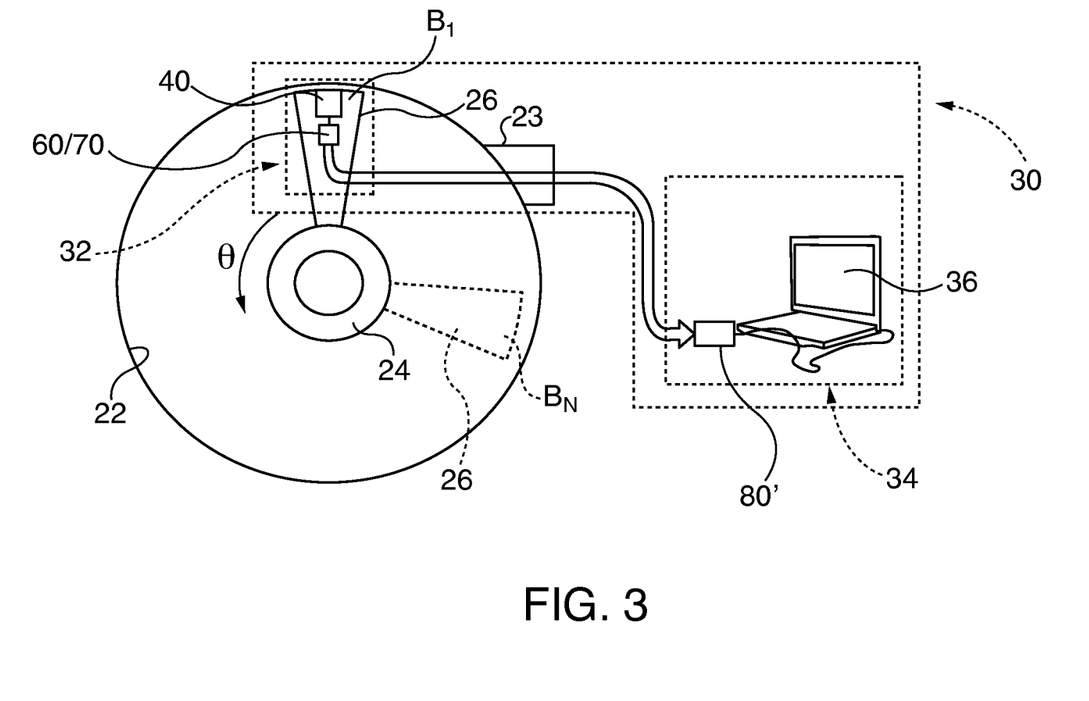
FIG. 3 is an elevational schematic view of another embodiment of a turbine tip gap clearance measurement system of the invention coupled to a turbine, including a blade mounted instrument system with a probe system and a data acquisition system that are communicatively coupled to a data processing system outside the turbine via a portable data storage device transferred from the blade mounted instrument system to a data processing system interface for downloading to the data processing system personal computer.
Figure 4:
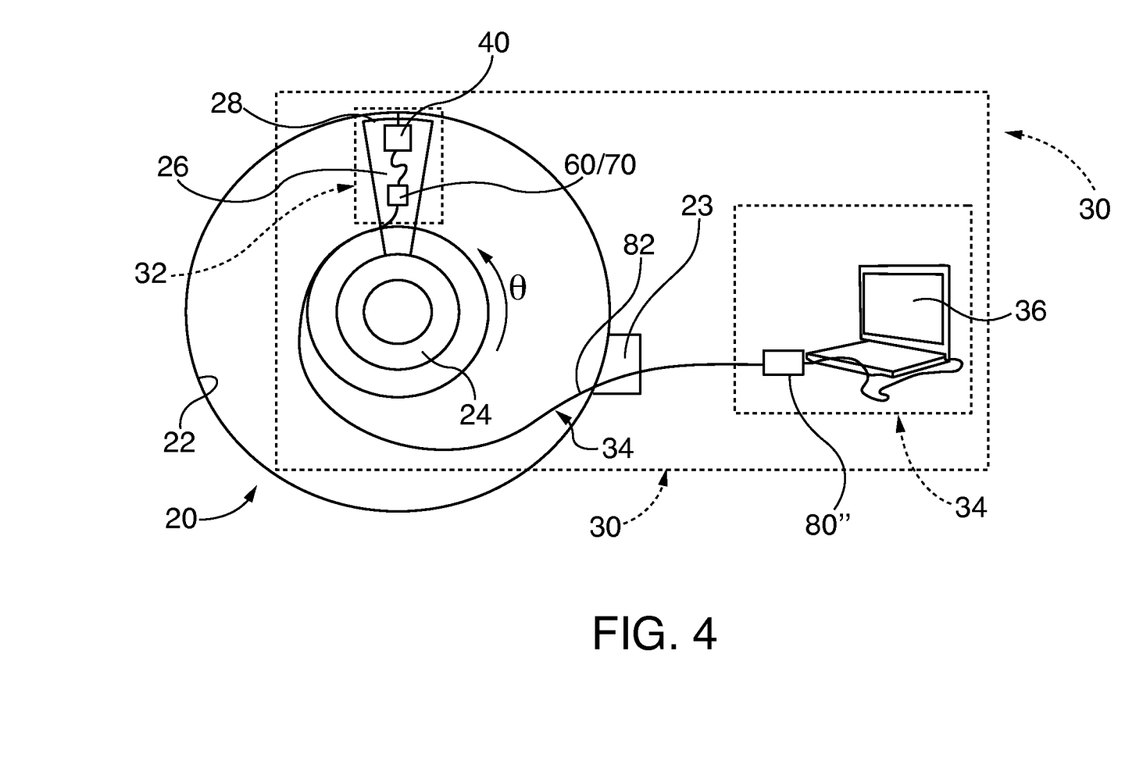
FIG. 4 is an elevational schematic view of another embodiment of a turbine tip gap clearance measurement system of the invention coupled to a turbine, including a blade mounted instrument system with a probe system and a data acquisition system that are communicatively coupled to a data processing system outside the turbine via a cable.

As shown in FIG. 3 by the double arrow the blade mounted instruments 32 can be installed and removed via a turbine access port 23 or manway, or by removing a section of the turbine external housing that does not circumscribe the blade tips 28. Similarly, if a wireless communication system is not utilized between the data acquisition module 70 and the data analyzer system 34, a portable memory device may be incorporated into the data acquisition module and to store the acquired rotational and/or displacement data sets. The memory device is removed after data acquisition by the blade tip clearance system 30 and subsequently transported as shown schematically by the double lines for coupling to the data analyzer interface 80' and for subsequent downloading of the data sets. Alternatively, as shown in FIG. 4, the data acquisition module 70 may be communicatively coupled to the data analyzer interface 80" by a physical cable 82 routed through an access port 23. The cable 82 has sufficient length to be wrapped around the turbine rotor 24.

Figure 5:
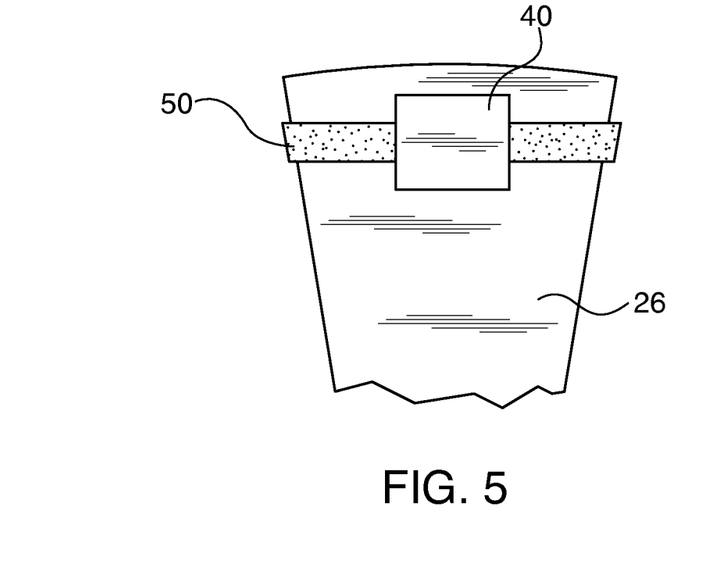
FIG. 5 is a detailed elevational schematic view of an embodiment of a retaining strap for mounting a probe system of the invention to a turbine blade, having mating hook and loop fasteners.
Figure 6:
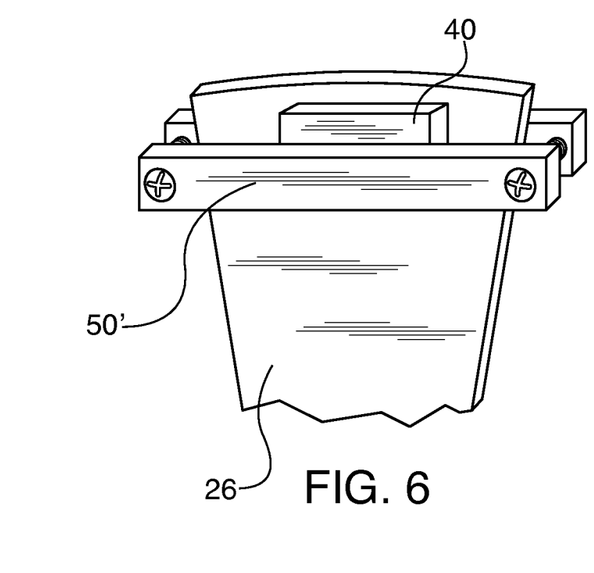
FIG. 6 is a detailed elevational schematic view of an embodiment of a retaining clamp for mounting a probe system of the invention to a turbine blade, having opposed plates that are compressively coupled to a turbine blade circumference by screws.

As previously noted the blade mounted instruments 32 are coupled or otherwise affixed to the blade 26 so that they do not inadvertently drop within the turbine interior during a blade gap measurement procedure. As shown in FIG. 5, a probe 40 of the blade mounted instrument is coupled to the blade 26 by a hook and loop fastened strap 50 that is circumferentially wrapped about the blade. In FIG. 6 the probe 40 is coupled to the blade 26 by a retaining clamp 50', having opposed plates that are compressively coupled to a turbine blade circumference by screws.

Figure 7:
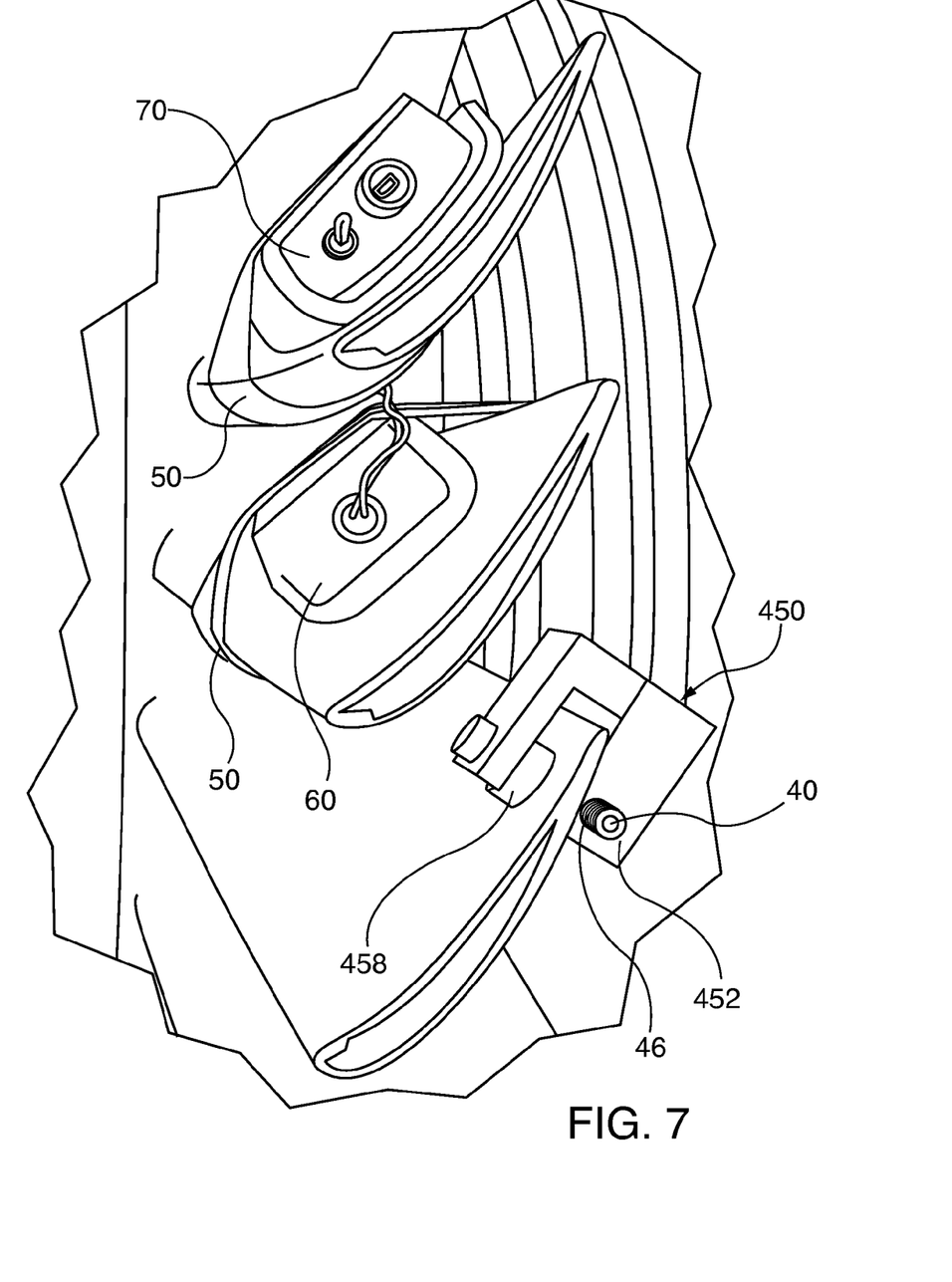
FIG. 7 is a perspective elevational view of a turbine blade row including an embodiment of a blade mounted instrument of the invention that is coupled to a turbine blade with an embodiment of a sensor fixture of the present invention.
Figure 8:
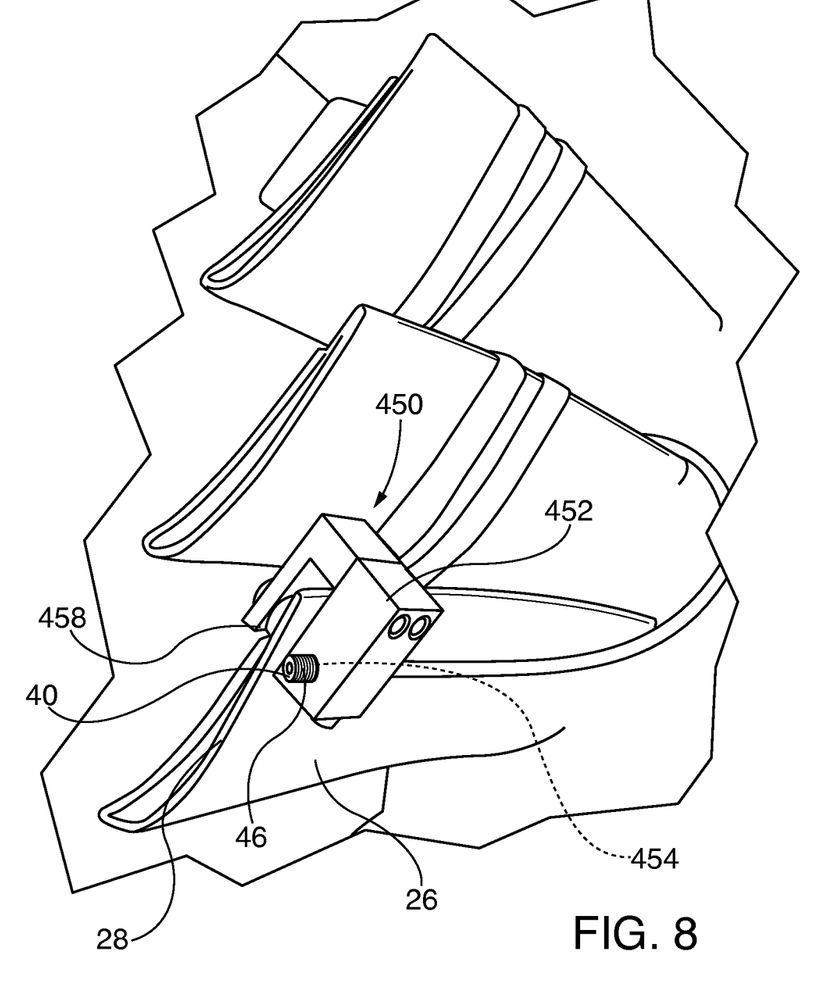
FIG. 8 is a perspective elevational view of the embodiment of a blade mounted instrument and sensor fixture of FIG. 7 taken from the opposite side of the blade row.
Figure 9:
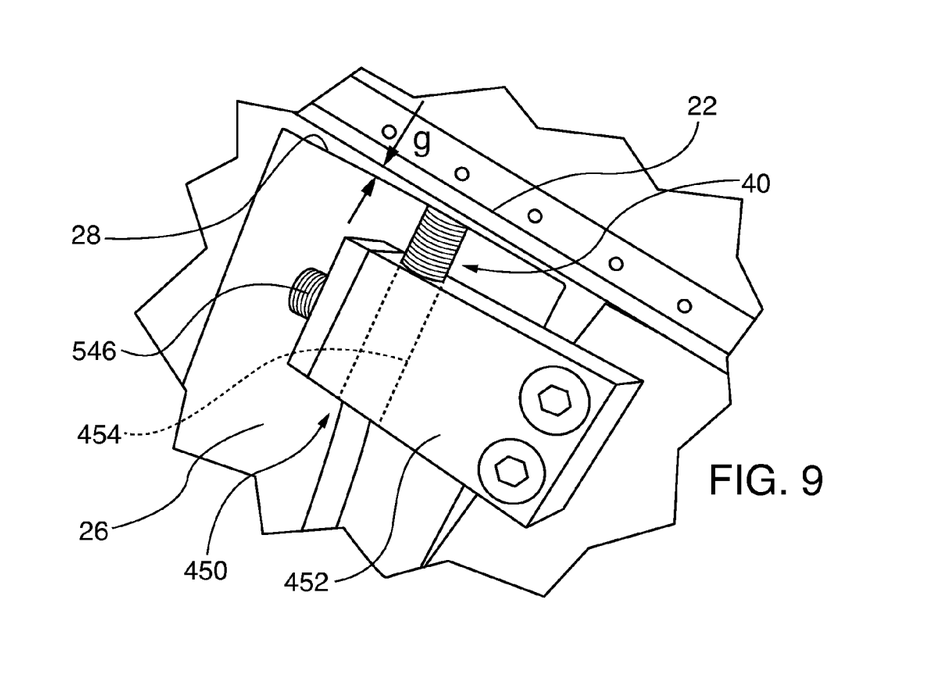
FIG. 9 is a detailed perspective view of the sensor fixture of FIG. 8, showing alignment of the non-contact sensor probe with the blade tip.

The invention also includes embodiment of sensor fixtures that facilitate mounting of the blade gap measurement instrumentation or other types of sensors or instruments to a turbine blade. FIG. 7-9 show a first embodiment of a sensor fixture 450, which comprises a clamp base 452 with a generally C-shaped profile for slidable insertion and capture of a turbine blade 26 therein. A clamping mechanism in the form of a clamp screw 458 is tightened to clamp the blade within the clamp base 452. The optical sensor 40 has a threaded exterior portion 46 that mate with corresponding threads formed in an aperture 454 that is defined by the clamp base 452. The aperture 454 functions as a sensor retention mechanism for retaining and calibrating the sensor 40. Calibration is achieved by advancing/moving the sensor 40 outer threads 46 relative to the retention mechanism aperture threads 454 in either direction, so that the sensor is oriented a defined distance from the turbine ring inner circumference 22. Once the sensor 40 is calibrated its desired position relative to the blade tip 28 or the turbine ring inner circumference 22 the screw locking mechanism 546 is tightened to set or fix the sensor and retention mechanism relative positions.

The blade mounted instrument 232 of FIGS. 8 and 9 comprise a contact displacement probe 240 with a displaceable probe tip 242 that is in contact with the blade circumscribing turbine casing inner diameter surface 22. Physical displacement of probe tip 242, as shown by the double-ended arrow, generates a displacement data set. The blade mounted instrument 232 is coupled to blade 26 by one or more magnets 250. Displacement data generated by the contact displacement probe 240 is gathered by data acquisition module 270 that in turn routes the displacement data to the data analyzer system interface 280 via wireless communication (e.g., Bluetooth) protocols, as previously described. The turbine blade rotational positional data set is generated by the turbine rotor positional sensor 260 rather than a blade-mounted positional sensor. The rotational positional data set is routed to the data analyzer system 234 by known means, such as a communications cable. The data analyzer system 234 correlates the received displacement and rotational position data sets with blade gap about the turbine casing inner diameter 22 as previously described.

Figure 10:
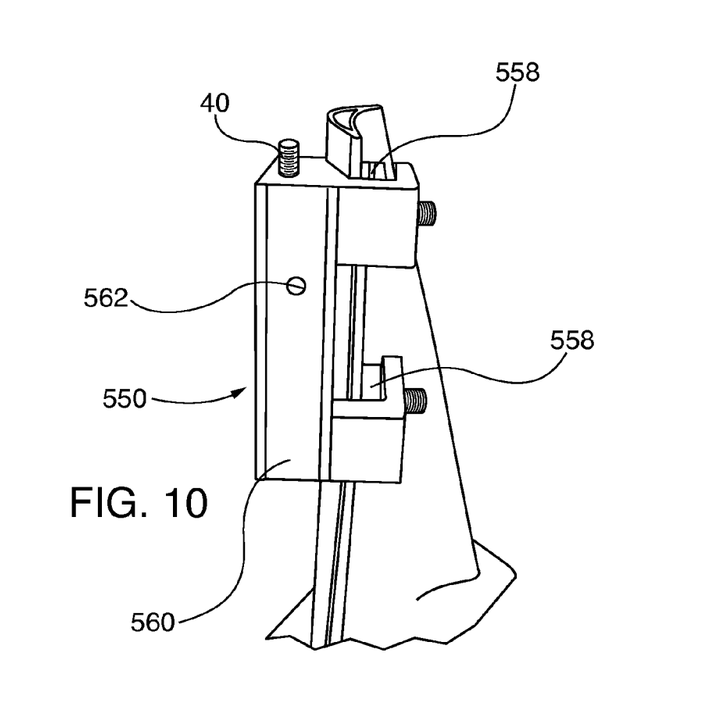
FIG. 10 is an elevational perspective view of another embodiment of a sensor fixture and sensor of the present invention coupled to a turbine blade.
Figure 11:
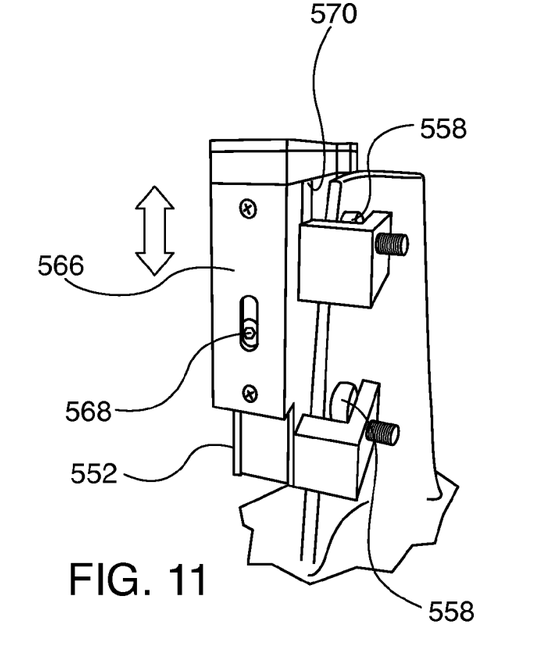
FIG. 11 is an elevational perspective view of the sensor fixture of FIG. 10, showing attachment of an alignment bracket for calibrating the sensor position relative to the turbine blade tip.
Figure 12:
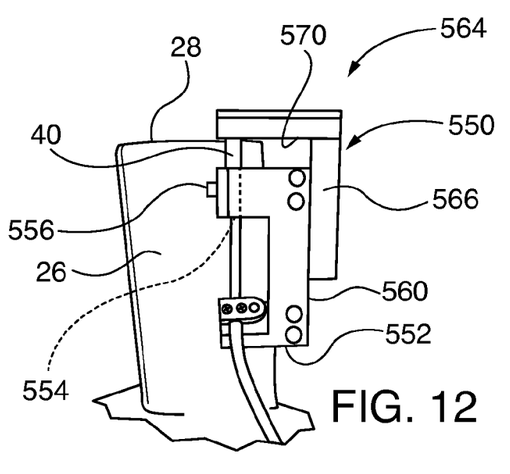
FIG. 12 is a side elevational view of the sensor fixture and alignment bracket of FIG. 11, showing sensor calibration alignment flush with the blade tip, prior to removal of the alignment bracket.

FIGS. 10-12 show another sensor fixture 550 embodiment. The sensor fixture 550 has a clamp base 552 with a pair of C-shape profile portions for slidable insertion and capture of a turbine blade therein at two spaced positions along a long axis of the blade with the clamping mechanisms 558. More than two C-profile portions and clamping mechanisms 558 may be utilized. As with the embodiment of FIGS. 7-9, the sensor fixture 550 includes a sensor retention mechanism in the form of a threaded aperture 554 that receives the external threads of the sensor probe 40 and a locking mechanism screw 556 for fixing sensor and sensor retention mechanism relative position. The sensor fixture 550 also has an L-shaped alignment bracket 264 with an alignment track 266 that is selectively coupled to a clamp base track 560 by a track retention screw 268. The track retention screw 268 mates with a corresponding threaded clamp track aperture 262. The alignment bracket 264 is selectively slidable relative to the clamp track 560 and is locked in a desired position by tightening the track retention screw 268. The alignment bracket 264 facilitates aligning the sensor fixture 550 to a fixed position relative to a blade tip 28 prior to tightening the clamping mechanisms 558 to a blade 26 by abutting the alignment bracket alignment surface 270 against the blade tip 28. Then the sensor 40 is calibrated by abutting it against the alignment bracket alignment surface 270 and thereafter tightening the sensor retention mechanism locking screw 556. The sensor 40 is now aligned flush with the blade tip 28, so that the displacement data set can be directly correlated with the blade tip gap g by the data analyzer 34.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A method for measuring gas turbine blade tip and turbine casing radial clearance gap, comprising:
   providing a gas turbine with a rotatable rotor having a turbine blade with a radially outwardly projecting tip in opposed spaced relationship with a circumscribing turbine casing, defining a gap there between;
   providing a non-contact displacement sensor that is capable of generating a displacement data set indicative of actual displacement;
   providing a sensor fixture including a sensor retention mechanism for calibrating the displacement sensor position and a clamp mechanism for clamping the fixture to the turbine blade;
   coupling the displacement sensor to the sensor fixture and coupling the sensor fixture to the turbine blade with the clamp mechanism, so that the non-contact displacement sensor is capable of generating a data set that is indicative of actual displacement relative to the circumscribing turbine casing without relative movement there between;
   calibrating the displacement sensor position relative to the blade tip by moving the entire displacement sensor within the sensor retention mechanism without moving the previously tightened clamping mechanism;
   coupling a rotor rotational position sensor to the turbine capable of determining actual rotational position without rotor rotational movement;
   rotating the rotor so that the turbine blade tip sweeps at least a portion of the circumscribing turbine casing while generating the displacement data set with the non-contact displacement sensor and a rotational position data set that is indicative of actual rotor rotational position with the rotational position sensor;

acquiring the displacement and rotational position data sets from any rotor rotational starting position with a data acquisition system that is coupled to the displacement and rotational position sensors; and correlating blade tip and circumscribing turbine casing radial clearance gap relative to rotational position with the displacement and rotational data sets in a data analyzer system that is coupled to the data acquisition system.

2. The method of claim 1, the non-contact displacement sensor comprising a non-contact optical displacement sensor having a transmitter and a pair of receivers.

3. The method of claim 1, further comprising a wireless communication system coupling the data acquisition system and the data analyzer system.

4. The method of claim 1, the displacement sensor calibration comprising:

aligning the sensor fixture to a fixed position relative to the blade tip with an alignment bracket coupled thereto and maintaining the sensor fixture alignment by tightening the clamping mechanism to the blade;

moving the entire displacement sensor within the sensor retention mechanism in contact with the alignment bracket without moving the previously tightened clamping mechanism; and locking the displacement sensor and the sensor retention mechanism relative positions.

5. The method of claim 4, further comprising aligning the displacement sensor flush with the blade tip with the alignment bracket and thereafter removing the alignment bracket from the sensor fixture.

6. The method of claim 1 further comprising utilizing the blade tip and turbine casing radial gap measurement information to align any one of the rotor, blades or turbine vanes within the turbine and thereafter re-measuring the radial gap to confirm said alignment.

7. A system for measuring gas turbine blade tip and turbine casing radial clearance gap in a gas turbine having a rotatable rotor, a turbine blade coupled to the rotor with a radially outwardly projecting tip in opposed spaced relationship with a circumscribing turbine casing, defining a gap there between, the system comprising:

a non-contact displacement sensor that is capable of generating a data set indicative of actual displacement relative to a circumscribing turbine casing, without relative movement there between, when the sensor is coupled to a turbine blade;

a sensor fixture having a sensor retention mechanism retaining and calibrating the displacement sensor by selected movement therein relative to a blade tip, and a clamp mechanism for clamping the fixture to a turbine blade, the entire sensor moveable relative to the blade tip for calibration without moving the clamping mechanism;

a rotor rotational position sensor coupled to the turbine that is capable of generating data set that is indicative of actual rotor rotational position;

a data acquisition system that is coupled to the displacement and rotational position sensors, for acquiring the displacement and rotational position data sets from any rotor rotational starting position during rotor rotation as the turbine blade tip sweeps at least a portion of the circumscribing turbine casing when the sensor fixture is clamped to the turbine blade; and a data analyzer system, coupled to the data acquisition system for correlating, with the displacement and rotational data sets, the blade tip and circumscribing turbine casing radial clearance gap relative to rotational position.

8. The system of claim 7, the non-contact displacement sensor comprising a non-contact optical displacement sensor having a transmitter and a pair of receivers.

9. The system of claim 8, the non-contact optical displacement sensor having a threaded portion that mate with a corresponding threaded portion in the sensor retention mechanism; and a screw locking mechanism for fixing displacement sensor and sensor retention mechanism relative position.

10. The system of claim 7, the sensor fixture further comprising:

a clamp base coupled to the retention mechanism and the clamping mechanism;

an alignment bracket selectively coupled to the clamp base for aligning the sensor fixture to a fixed position relative to a blade tip prior to tightening the clamping mechanism to a blade and for calibrating the displacement sensor by abutting it against the alignment bracket.

11. The system of claim 10, the sensor having a threaded portion that mate with a corresponding threaded portion in the sensor retention mechanism; and a screw locking mechanism for fixing displacement sensor and sensor retention mechanism relative position.

12. A sensor fixture for coupling a sensor to a turbine blade, comprising:

a clamp base;

a clamp screw coupled to the clamp base, for coupling a turbine blade to the clamp base; and a sensor retention mechanism coupled to the clamp base, for retaining and calibrating a sensor by selective repositioning movement of the entire sensor relative to the retention mechanism without adjusting the clamp screw.

13. The sensor fixture of claim 12, further comprising a retention mechanism threaded portion for mating with a corresponding sensor threaded portion; and a locking mechanism for fixing sensor and sensor retention mechanism relative position.

14. The sensor fixture of claim 12, further comprising an alignment bracket selectively coupled to the clamp base for aligning the sensor fixture to a fixed position relative to a blade tip prior to tightening the clamping mechanism to a blade and for calibrating the sensor by abutting it against the alignment bracket.

15. The sensor fixture of claim 14, further comprising the alignment bracket and the clamp base having mating slidable track portions for selective sliding adjustment there between and an alignment bracket lock mechanism for fixing alignment bracket and clamp base relative position.

16. The sensor fixture of claim 15, the alignment bracket having a generally L shape comprising an alignment bracket slidable track portion and an alignment surface portion for abutment with a turbine blade tip and the sensor during sensor calibration.

17. The sensor fixture of claim 16, the alignment bracket selectively removable from the clamping mechanism after sensor calibration by uncoupling the alignment bracket lock mechanism there between.

18. The sensor fixture of claim 12, the clamp base having a generally C-shape profile portion for slidable insertion and capture of a turbine blade therein; the clamping mechanism retaining the captured turbine blade in a fixed position.

19. The sensor fixture of claim 18, the clamp base having at least two C-shape profile portions for slidable insertion and capture of a turbine blade therein at two spaced positions along a long axis of the blade with the clamping mechanism.

20. The sensor fixture of claim 19, further comprising an alignment bracket selectively coupled to the clamp base for aligning the sensor fixture to a fixed position relative to a blade tip prior to tightening the clamping mechanism to a blade and for calibrating the sensor by abutting it against the alignment bracket.

* * * * *